Jan. 14, 1969 J. L. BATES 3,421,396
AUTO LOOP DRUM
Filed Dec. 28, 1966
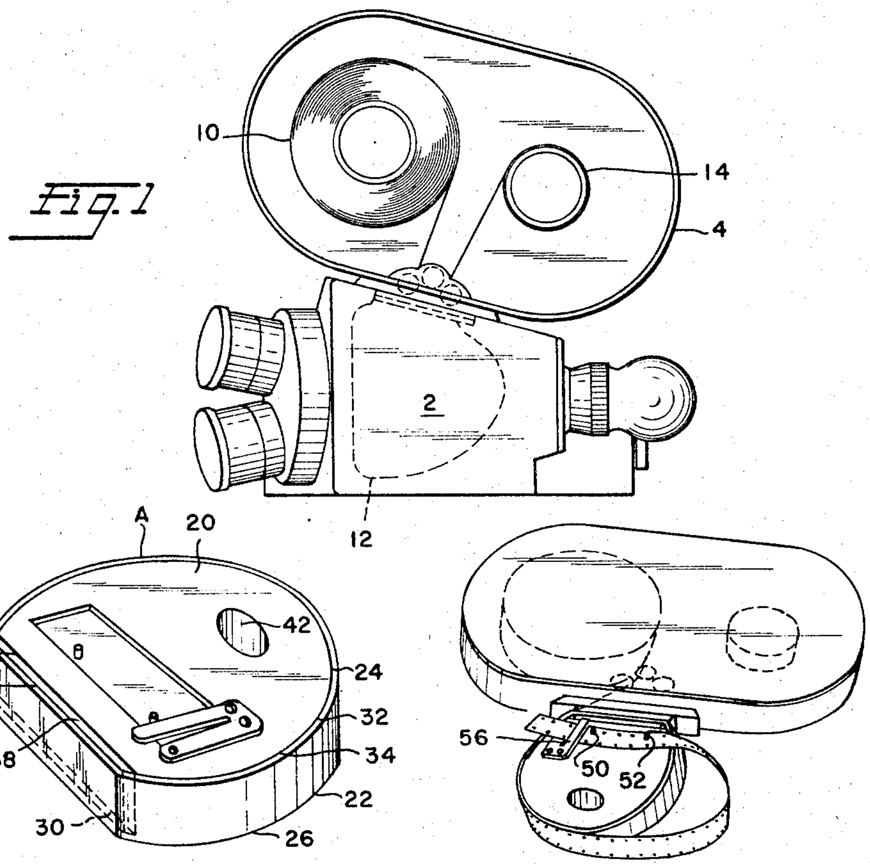
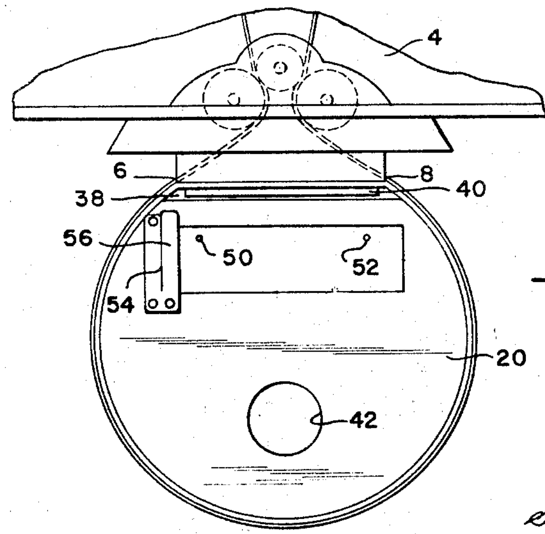
INVENTOR
JAMES L. BATES
BY
Scrivener Parker Scrivener + Clarke
ATTORNEYS

United States Patent Office 3,421,396 Patented Jan. 14, 1969

3,421,396

AUTO LOOP DRUM

James L. Bates, 2030 N. El Paso St., Colorado Springs, Colo. 80907

Filed Dec. 28, 1966, Ser. No. 605,381
U.S. Cl. 83—451 7 Claims
Int. Cl. B26d 7/00

ABSTRACT OF THE DISCLOSURE

A film measuring device for use with a camera of the type having a detachable external film magazine, for temporary attachment to the magazine when detached from the camera, the device being drum shaped and its peripheral surface being exactly the length of the film loop which must be within the camera when it is operative. The device also carries a film cutter which is constructed to bisect transversely aligned socket holes in the film.

*Brief summary of the invention*

This invention relates broadly to cameras and, more particularly, to cameras of the type having an external film magazine having within it a film feed roll and a film take-up roll, and from which a film loop extends into the body of the camera. In the use and operation of cameras of this type it is necessary for proper operation that the film loop outside the magazine and within the camera have an exact length, by which is meant that it have an exact predetermined number of frames, this being 36 frames of 16 mm. film in many well known and widely used types of cameras. Heretofore it has been necessary to use certain inexact procedures to measure this predetermined length of film and, in general, the known means and procedures for doing this have been unsatisfactory, it being remembered that the operation of loading the magazine and preparing the film loop is normally carried out in total darkness. The object of the invention has therefore been to provide new and improved means and apparatus adapted to be associated with the magazine of a camera of the type described for providing a simple but accurate means for measuring the length of the film loop or, expressed otherwise, drawing out of the magazine only a predetermined length of film or number of frames, thereby insuring that the magazine and camera will be properly prepared for operation.

*Description of the drawings*

FIG. 1 is a side and part sectional view of a camera and film magazine of the type to which the invention relates, showing the film loop within the camera and the film rolls within the magazine;

FIG. 2 is a perspective view of the loop measuring drum provided by the invention;

FIG. 3 is a perspective view showing the measuring drum in operative position on the film magazine and the film in position to be cut, and FIG. 4 is a side elevational view of the film measuring device provided by the invention, being shown mounted in operative position on a film magazine, which is partially shown.

*Detailed description of the invention*

A camera and magazine assembly of the general type to which the invention relates is shown in FIG. 1 and comprises a camera 2 and a film magazine 4, the latter being releaseably attached to the former and the two being provided with registering film exit and inlet ports 6, 8 through which film passes from a supply roll 10 within the magazine, into the body of the camera where it forms a loop 12, and back to the magazine where it is wound on a take-up roll 14. In all such cameras the film loop 12 must be of an exact and pre-determined length for proper operation of the camera, and in this specification this length will be 36 frames of 16 mm. film.

Means are provided by the invention for measuring this pre-determined length of film as it is drawn from the magazine so that when the end of the film is re-inserted into the magazine and engaged with the take-up roll there will be left an external loop of exactly 36 frames which may be placed into the camera. This means is shown in FIG. 2 of the drawings and comprises a drum shaped device A having parallel side faces 20, 22 which have aligned part circular edges 24, 26, aligned straight edges 28, 30 and a surrounding edge-forming strip or band 32 which connects the arcuate edges 24, 26 as shown at 34 and is spaced outwardly from the straight edges 28, 30 as shown at 36 to form a slot 38. The part-circular surface formed by the arcuate part of the strip 32 provides a fixed base of exact pre-determined length, which in this case is 36 frames of 16 mm. film, against and on which the film drawn from the magazine may be closely and firmly laid in face-to-face engagement to measure the desired pre-determined length of film which must be within the camera when it is operated. The slot 36 is of such length and width that it will easily but closely receive the magazine film guard 40. The body of the drum A is provided with a finger opening 42 extending between the side walls 20, 22 and providing means for manipulating the drum into and out of attachment to the magazine.

When film is drawn out of the magazine and is to be re-inserted into the magazine for attachment to the take-up roll 14 it is necessary and desirable that the end edge of the film bisect a pair of aligned sprocket holes in the film in order to provide means which may be placed against the teeth of the take-up roll sprocket in order to facilitate winding the film. The means described above are provided by the invention for measuring film to an exact pre-determined length, and the invention also provides means for cutting the film to provide the open sprocket holes at the end edge of the film. Such means comprise an assembly of parts mounted on the side wall 20 of the loop measuring drum and including two upstanding pins 50, 52 which are spaced apart by such a distance that they may be received within two longitudinally aligned sprocket holes in the film so that they will hold the film end ın a temporarily fixed position. Associated with these pins and spaced from one of them by a distance equal to the spacing between centers of sprocket holes along the length of the film is a cutting edge 54 which is formed on a spring arm 56 which is normally raised above the surface of the side wall 20 but may be depressed when it is desired to cut the end of the film.

In the use and operation of the film measuring and cutting means provided by the invention the magazine 4 is separated from the camera 2 and its side cover plate and film guard are removed, as shown in FIG. 3. The film measuring drum A is now assembled to the magazine by inserting the magazine film guard slot 40 within the slot 38 of the measuring drum. A roll of film 10 is placed on the supply spindle within the magazine and the end of the film is drawn outwardly from the magazine through the exit port 6. With the drum in place on the magazine the end of the film is drawn from the supply roll 10 through the magazine exit port 6, partially about the surface of the drum A, as shown in FIG. 3, and under the trimming arm 56 to a position in which the trimmer blade bisects a pair of sprocket holes transversely of the film, and when the film is in this position the blade is operated to cut the film. The film is now led about the solid and immovable arcuate surface of the drum which, as stated, is equal in length to 36 frames of 16 mm. motion picture film. The cut end of the film is inserted into the supply port 8 of the magazine to a position in which the bisected sprocket holes in the end of the film engage the sprockets of the take-up spindle. Any excess of film is now pulled back into the "stock" side of the magazine by turning the supply roll 10, thus bringing the film which is outside the magazine tightly about the arcuate surface of the drum. With the film in this taut condition the end of the film is pushed into the magazine through the intake port and the end pair of full sprocket holes in the film is engaged with the sprocket of the take-up spool. There is now a loop of 36 frames surrounding and in contact with the surface of the drum and outside the magazine. The film guard slot cover is fastened to the loaded magazine, making the magazine light-tight, and the measuring drum is removed from the magazine by withdrawing the magizine film guard 40 from the slot 38 of the measuring drum. The film loop outside the magazine is now exactly 36 frames in length, the film sprocket holes are engaged within the film sprockets of the take-up spool and maintain the film loop in exactly the desired length so that it may be placed within the camera as shown in FIG. 1.

While I have described and illustrated in this specification one form which the invention may take, it will be understood that other embodiments of the invention, as well as modifications of that disclosed, may be made and practiced without departing in any way from the spirit or scope of the invention, for the limits of which reference must be made to the appended claims.

What is claimed is:

1. In combination with a film magazine for removable attachment to a camera and comprising an enclosed chamber having inlet and exit film ports and adapted to have therein a supply roll of film and a take-up reel, a device for measuring a film loop of pre-determined length exterior to the magazine and fastened at its ends to the supply roll and the take-up reel for positioning withiin the camera when the magazine is attached to the camera, said device comprising a body having a generally flat surface adapted to be releasably attached to the magazine between the inlet and exit film ports, and having a convex surface connecting the ends of the flat surface, the length of the convex surface being equal to the pre-determined length of the film loop.

2. The combination according to claim 1, comprising in addition means on the loop measuring device for cutting the end of the film.

3. The combination according to claim 1, comprising in addition means on the loop measuring device for engaging sprocket holes in the film to hold the film in fixed position, and means on the loop measuring device for cutting the end of the film.

4. The combination according to claim 1, comprising in addition means on the loop measuring device for engaging sprocket holes in the film to hold the film in fixed position, and means on the loop measuring device for cutting the end of the film, said film engaging and film cutting means being so positioned with respect to each other that the cutting means bisects a pair of film sprocket holes when it is operated.

5. As a new article of manufacture, a film loop measuring device for releaseable attachment to a camera magazine, comprising a body having parallel side faces and a peripheral surface formed of a flat part for attachment to a magazine and a convex part about which the film is placed for measurement and which is equal in length to the pre-determined length of film loop.

6. The new article of manufacture according to claim 5, comprising in addition means on one of the side faces to engage sprocket holes in the film to hold the film in fixed position, and means on the same side face to cut the end of the film.

7. The new article of manufacture according to claim 6, in which the film holding means and the film cutting means are so positioned with respect to each other that the film cutting means bisects a pair of sprocket holes when operated.

References Cited

UNITED STATES PATENTS

| | | | |
|---|---|---|---|
| 1,540,362 | 6/1925 | Norvell | 83—522 |
| 1,638,569 | 8/1927 | Fritts | 242—68 X |
| 2,140,156 | 12/1938 | Harschnek | 33—127 |

JAMES M. MEISTER, *Primary Examiner.*

U.S. Cl. X.R.

83—522, 649, 902; 33—127